(12) United States Patent
Wu et al.

(10) Patent No.: US 11,458,001 B2
(45) Date of Patent: Oct. 4, 2022

(54) ULTRASONIC DENTAL SCALER TRANSDUCER AND DENTAL SCALER HANDLE COMPRISING SAME

(71) Applicant: GUILIN WOODPECKER MEDICAL INSTRUMENT Co., Ltd., Guangxi (CN)

(72) Inventors: Xunxian Wu, Guangxi (CN); Yun Li, Guangxi (CN); Xiuyou Qin, Guangxi (CN)

(73) Assignee: Guilin Woodpecker Medical Instrument Co., Ltd., Guangxi (CN)

( * ) Notice: Subject to any disclaimer, the term of this patent is extended or adjusted under 35 U.S.C. 154(b) by 280 days.

(21) Appl. No.: 16/348,446

(22) PCT Filed: Oct. 12, 2017

(86) PCT No.: PCT/CN2017/105785
§ 371 (c)(1),
(2) Date: May 8, 2019

(87) PCT Pub. No.: WO2018/099192
PCT Pub. Date: Jun. 7, 2018

(65) Prior Publication Data
US 2020/0078150 A1    Mar. 12, 2020

(30) Foreign Application Priority Data
Nov. 30, 2016 (CN) .......................... 201611075472.9

(51) Int. Cl.
*A61C 17/20*    (2006.01)
(52) U.S. Cl.
CPC .......... *A61C 17/20* (2013.01); *A61C 2202/00* (2013.01)

(58) Field of Classification Search
CPC ..... A61C 17/20; A61C 1/0046; A61C 8/0006; A61B 18/22; A61B 5/0088; A61B 8/0006; A61B 2018/00321; A61B 2018/00577
(Continued)

(56) References Cited

U.S. PATENT DOCUMENTS 3,651,576 A * 3/1972 Massa .................... A61C 17/20
                                                          433/119
3,664,191 A * 5/1972 Hermanns ............... G01F 15/12
                                                          73/861.12

(Continued)

FOREIGN PATENT DOCUMENTS

CN   103341438 A * 10/2013
CN   103341438 A   10/2013
(Continued)

*Primary Examiner* — Matthew M Nelson
(74) *Attorney, Agent, or Firm* — Craft Chu PLLC; Andrew W. Chu

(57) ABSTRACT

The ultrasonic dental scaler transducer includes a horn at the front end, a piezoelectric ceramic at the middle, and a main rod at the rear end. The transducer also includes a connecting rod. A rear end of the horn is provided with a connecting groove. A front end of the connecting rod is sealingly connected to the connecting groove, and a rear end of the connecting rod extends through the main rod and extends beyond the main rod for a certain length. The piezoelectric ceramic sleeves the connecting rod, and the front and rear ends of the piezoelectric ceramic are respectively in abutting connection with the horn and the main rod. The present invention further discloses a dental scaler handle.

10 Claims, 3 Drawing Sheets

(58) Field of Classification Search
USPC .......................................... 433/119, 165, 215
See application file for complete search history.

(56) References Cited

U.S. PATENT DOCUMENTS

| | | | | |
|---|---|---|---|---|
| 3,703,037 | A * | 11/1972 | Robinson | A61C 17/20 |
| | | | | D24/146 |
| 3,990,452 | A * | 11/1976 | Murry | A61B 17/22012 |
| | | | | 606/169 |
| 4,169,984 | A * | 10/1979 | Parisi | A61C 17/20 |
| | | | | 310/323.18 |
| 4,230,453 | A * | 10/1980 | Reimers | A61C 1/088 |
| | | | | 362/119 |
| 4,319,716 | A * | 3/1982 | Lauer | B05B 17/0623 |
| | | | | 239/102.2 |
| 4,838,853 | A * | 6/1989 | Parisi | A61B 17/320016 |
| | | | | 604/22 |
| 4,861,332 | A * | 8/1989 | Parisi | A61F 9/00745 |
| | | | | 604/22 |
| 5,162,044 | A * | 11/1992 | Gahn | A61F 9/00745 |
| | | | | 604/22 |
| 5,371,429 | A * | 12/1994 | Manna | B06B 1/0618 |
| | | | | 310/328 |
| 5,413,556 | A * | 5/1995 | Whittingham | A61F 9/00745 |
| | | | | 604/22 |
| 5,843,109 | A * | 12/1998 | Mehta | B06B 1/0618 |
| | | | | 606/169 |
| 6,716,028 | B2 * | 4/2004 | Rahman | A61C 1/08 |
| | | | | 433/86 |
| 7,217,128 | B2 * | 5/2007 | Atkin | A61N 7/00 |
| 9,700,339 | B2 * | 7/2017 | Nield | A61N 7/00 |
| 10,966,744 | B2 * | 4/2021 | Rhee | A61B 17/320068 |
| 2004/0265776 | A1 * | 12/2004 | Tipton | A61C 17/20 |
| | | | | 433/119 |
| 2006/0234185 | A1 * | 10/2006 | Ziemba | A61C 3/03 |
| | | | | 433/119 |
| 2009/0036914 | A1 * | 2/2009 | Houser | A61B 17/320068 |
| 2015/0072304 | A1 * | 3/2015 | Swatton | A61C 1/08 |
| | | | | 433/86 |
| 2016/0081764 | A1 * | 3/2016 | Yasushi | A61C 17/20 |
| | | | | 433/119 |

FOREIGN PATENT DOCUMENTS

| | | |
|---|---|---|
| CN | 204169899 U | 2/2015 |
| CN | 105147406 A | 12/2015 |
| CN | 205683119 U | 11/2016 |
| CN | 106491228 A | 3/2017 |
| CN | 106491230 A | 3/2017 |
| CN | 106725956 A | 5/2017 |

* cited by examiner

ULTRASONIC DENTAL SCALER TRANSDUCER AND DENTAL SCALER HANDLE COMPRISING SAME

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention belongs to the field of dental instruments, and particularly relates to an ultrasonic dental scaler transducer and a dental scaler handle including the same.

2. Description of Related Art Including Information Disclosed Under 37 CFR 1.97 and 37 CFR 1.98

The prior art discloses a waterproof transducer which is mainly composed of a horn, a piezoelectric ceramic and a main rod which are coaxially connected. The main rod is composed of a base body and a connecting rod; the piezoelectric ceramic sleeves the connecting rod; the horn is threadedly connected to the connecting rod; and the piezoelectric ceramic is sandwiched between the horn and the connecting rod. A gap is left between the circumferential surface of the connecting rod and an inner ring of the piezoelectric ceramic. Each of the horn and the base body of the main rod is provided with an injection hole which is in communication with the gap; and the gap and the injection holes are filled with silica gel.

Although the connecting rod of the transducer described above is longer than the connecting rods of some transducers, the coaxiality of the transducer described above is not high, so that the comfort of the handle is poor.

BRIEF SUMMARY OF THE INVENTION

An object of the present invention is to provide a novel ultrasonic dental scaler transducer to solve deficiencies in the prior art.

A technical solution of the present invention is as follows. A novel ultrasonic dental scaler transducer includes a horn at the front end, a piezoelectric ceramic at the middle, and a main rod at the rear end. The transducer further includes a connecting rod, and a rear end of the horn is provided with a connecting groove. A front end of the connecting rod is sealingly connected to the connecting groove, and a rear end of the connecting rod extends through the main rod and extends beyond the main rod for 30 mm to 33 mm. The piezoelectric ceramic sleeves the connecting rod, and the front and rear ends of the piezoelectric ceramic are respectively in abutting connection with the horn and the main rod.

The present invention has the advantages and positive effects that the connecting rod of the present invention extends beyond the main rod for a certain length, and is much longer than an ordinary connecting rod, which ensures the coaxiality of the transducer during operation and greatly improves the comfort of a handle.

Further, a crescent ring is arranged between the main rod and the piezoelectric ceramic; and two crescent-shaped protrusions are symmetrically arranged on the circumference of the crescent ring.

The beneficial effect of the further improved solution described above lies in the followings. The crescent ring has the advantage of preventing a wafer from rotating relative to the horn by cooperating with a pressurizing tooling before injection molding, thereby avoiding misalignment of a brazing sheet relative to the wafer, and facilitating a subsequent welding process of an electrode wire.

Further, the transducer further includes a sleeve arranged in the connecting groove; one end of the sleeve is in abutting connection with an inner side wall of the connecting groove; and the other end of the sleeve is in abutting connection with a front end surface of the main rod.

The beneficial effect of the further improved solution described above lies in that the probability of ignition failure inside the transducer due to water leakage can be reduced.

Further, a rigid polytetrafluoroethylene tube is arranged between the piezoelectric ceramic and the main rod and is used for insulation.

The beneficial effect of the further improved solution described above lies in that the electromechanical conversion efficiency of the transducer is improved.

The present invention further discloses a dental scaler handle, including a casing, a light-emitting device, a top jacket, and the transducer described above.

DETAILED DESCRIPTION OF THE INVENTION

The principles and features of the present invention are described below with reference to the accompanying drawings. The examples are intended to be illustrative only and are not intended to limit the scope of the present invention.

Figure 1:
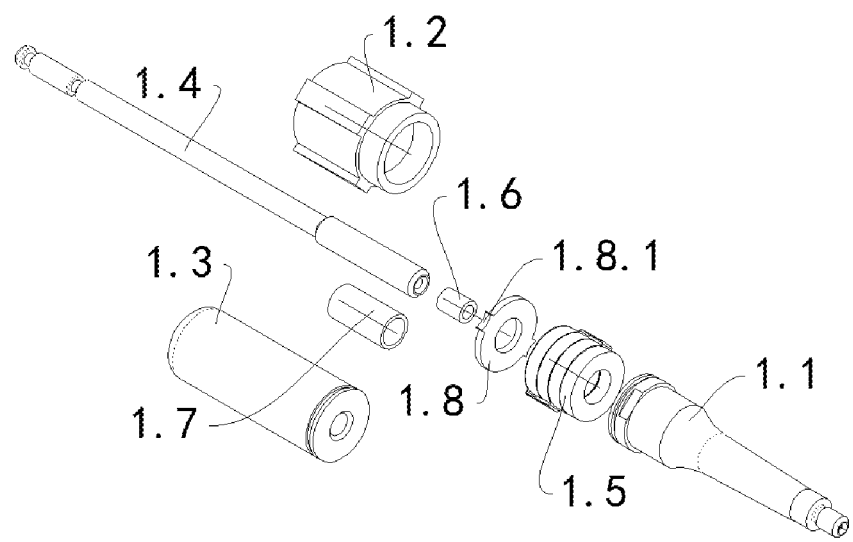
FIG. 1 is a schematically structural view of the present invention.
Figure 2:
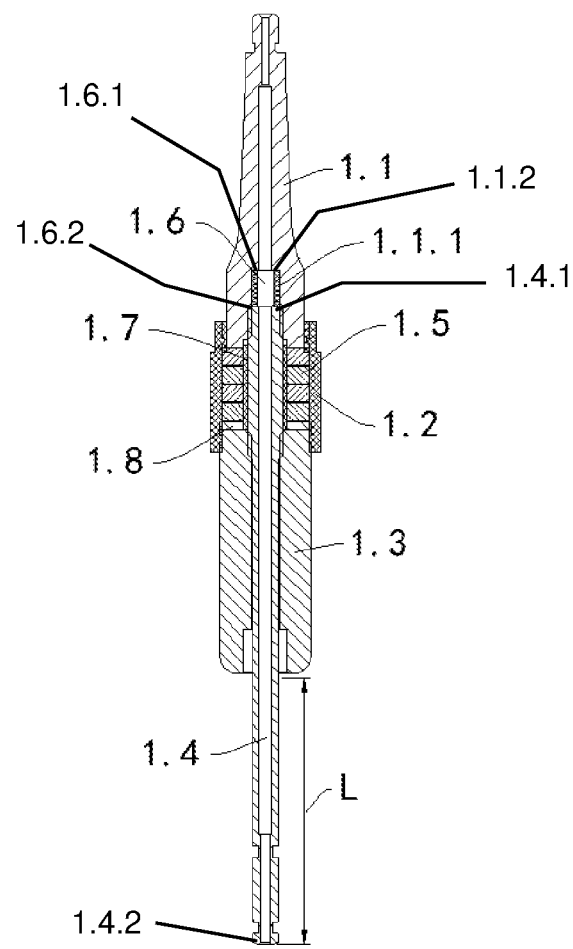
FIG. 2 is a cross-sectional view of the present invention.

As shown in FIGS. 1 and 2, a novel ultrasonic dental scaler transducer 1 includes a horn 1.1 at the front end, a piezoelectric ceramic 1.5 at the middle, and a main rod 1.3 at the rear end. The transducer 1 further includes a connecting rod 1.4, and a rear end of the horn 1.1 is provided with a connecting groove 1.1.1. A front connecting rod end 1.4.1 of the connecting rod 1.4 is sealingly connected to the connecting groove 1.1.1, and a rear connecting rod end 1.4.2 of the connecting rod 1.4 extends through the entire main rod 1.3 and extends beyond the main rod 1.3 for a certain length L (extension portion 1.4.3). L ranges from 30 mm to 33 mm, and preferably is about 31 mm in order to ensure the comfort of the handle and the structure of the casing of the handle. The connecting rod 1.4 has a diameter of 2 mm to 4 mm, and the diameter of the connecting rod 1.4 is preferably set to be about 3 mm in consideration of the extending length of the connecting rod 1.4. The connecting rod 1.4 and the main rod 1.3 are sealingly connected through threads. The piezoelectric ceramic 1.5 sleeves the connecting rod 1.4, and the front and rear ends of the piezoelectric ceramic 1.5 are respectively in abutting connection with the horn 1.1 and the main rod 1.3.

The biggest characteristic of the present invention is that the connecting rod 1.4 is very long and extends beyond the main rod 1.3 for a certain length (extension portion 1.4.3), and is much longer than the ordinary connecting rod. The connecting rod is connected with the horn 1.1, the main rod 1.3 and the casing 2, so that the coaxiality of the transducer is ensured during operation, thereby ensuring the comfort of the handle. As in FIG. 4, the rear connecting rod end 1.4.2 extends from the main rod 1.3 to the casing 2 so as to maintain the connecting rod 1.4, the horn 1.1, the main rod 1.3 and the piezoelectric ceramic 1.5 of the transducer 1 coaxial within the handle.

In the present invention, the length of the main rod 1.3 is increased, so as to ensure the comfort of the handle. But this makes the processing method of the present invention change, which in some way brings inconvenience to the subsequent welding process of an electrode wire. In order to solve the above technical problem to facilitate the subsequent welding process of the electrode wire, it is preferable to provide a crescent ring 1.8 between the main rod 1.3 and the piezoelectric ceramic 1.5. The crescent ring 1.8 is easy to be pressurized, and can effectively prevent a wafer from rotating relative to the horn 1.1 by cooperating with a pressurizing tooling before injection molding, thereby avoiding misalignment of a brazing sheet relative to the wafer. Two crescent-shaped protrusions 1.8.1 are symmetrically arranged on the circumference of the crescent ring 1.8.

Further, the crescent ring 1.8 is made of stainless steel.

Further, the crescent ring 1.8 has a diameter of 9 mm to 11 mm, and preferably 10.5 mm in consideration of the size of the entire structure, and has a thickness of 0.5 mm to 1.5 mm, and preferably 1 mm in consideration of the size of the entire structure.

In order to reduce the probability of ignition failure inside the transducer, the present invention is further optimized as follows. A sleeve 1.6 is arranged in the transducer 1, in particular, arranged in the connecting groove 1.1.1. One end (the front sleeve end 1.6.1) of the sleeve 1.6 is in abutting connection with an inner side wall 1.1.2 of the connecting groove 1.1.1, and the other end (the back sleeve end 1.6.2) of the sleeve 1.6 is in abutting connection with a front end surface of the main rod 1.3. Further, the junctions at two ends of the sleeve 1.6 needs to be sealingly connected, so as to effectively prevent the junction between the connecting rod 1.4 and the horn 1.1 from being flushed by water. Preferably, the sleeve 1.6 is made of a rigid polytetrafluoroethylene tube.

In order to improve the electromechanical conversion efficiency of the transducer, the present invention is also optimized as follows. A rigid polytetrafluoroethylene tube 1.7 is arranged between the piezoelectric ceramic 1.5 and the main rod 1.3 and is used for insulation. An end of the rigid polytetrafluoroethylene tube 1.7 close to the connecting groove 1.1.1 extends into the connecting groove 1.1.1. Preferably, the length of the rigid polytetrafluoroethylene tube 1.7 extending into the connecting groove 1.1.1 is 0.4 mm to 1 mm. The rigid polytetrafluoroethylene tube 1.7 has a length of 8.8 mm to 9.8 mm, and a thickness of 0.4 mm to 0.6 mm, and preferably 0.5 mm.

Figure 3:
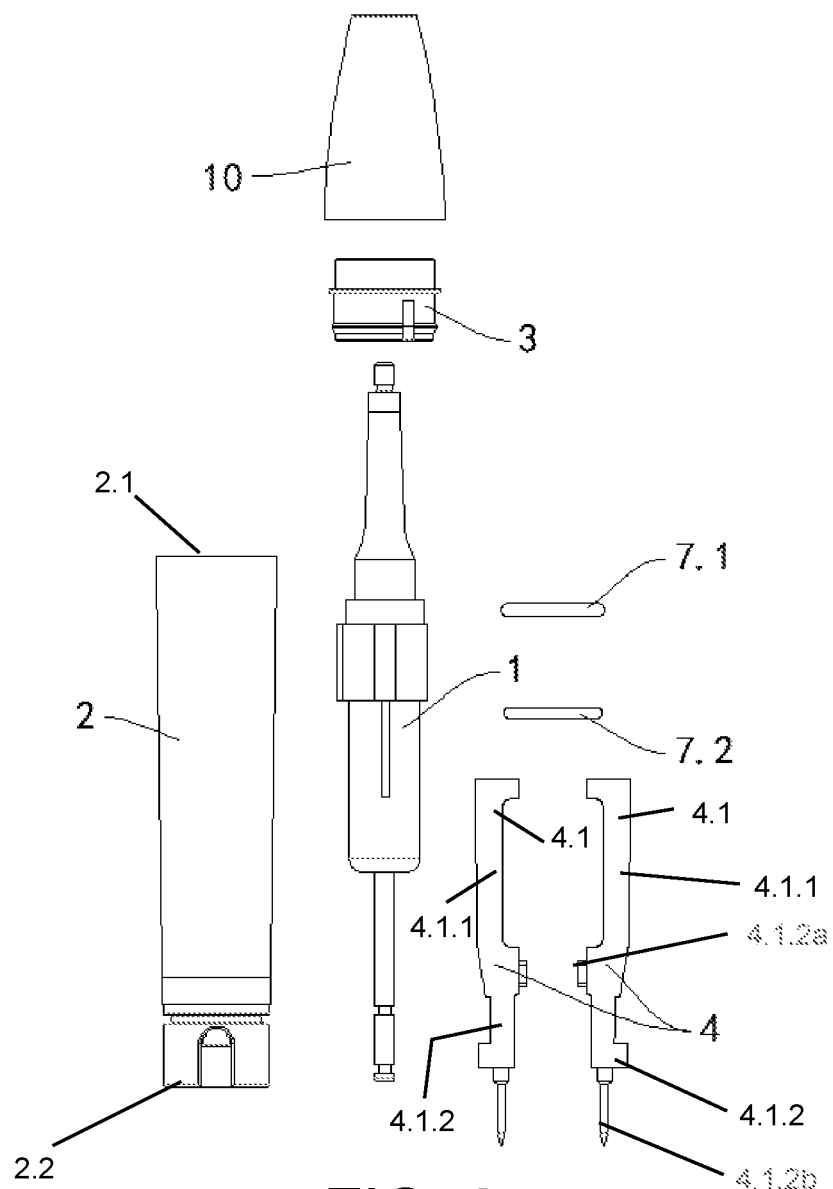
FIG. 3 is an exploded view of a handle of the present invention.
Figure 4:
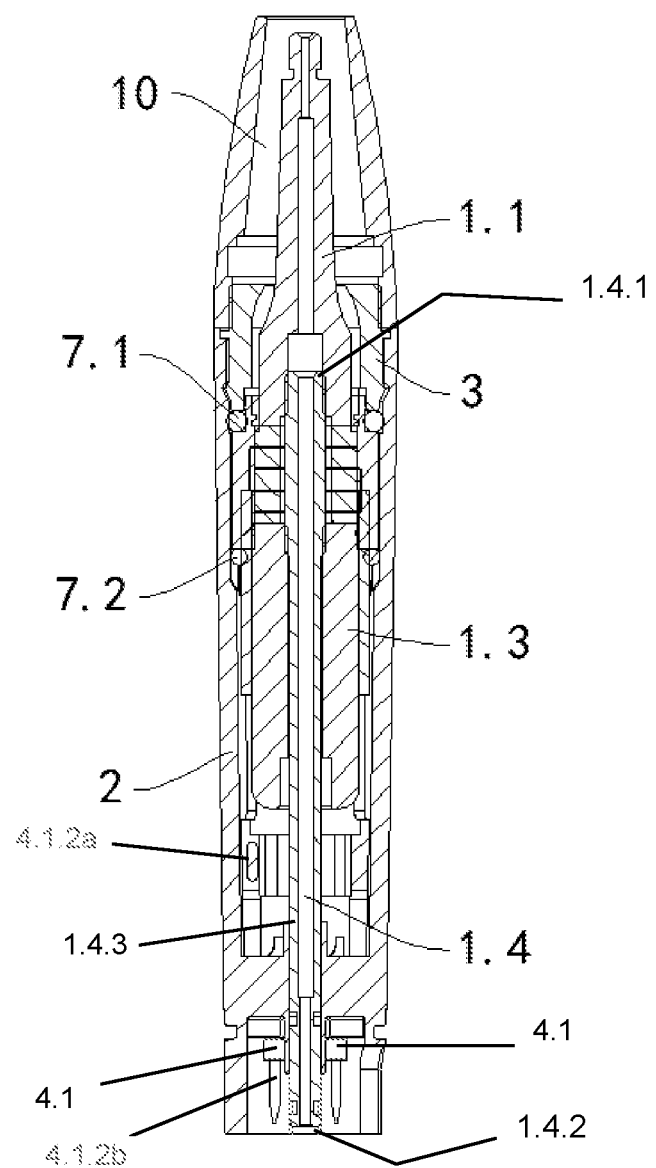
FIG. 4 is an assembling view of the handle of the present invention.

As shown in FIGS. 3 and 4, the present invention also discloses a dental scaler handle, including a casing 2 (having a proximal end 2.1 and a distal end 2.2), a light-emitting device 3, a top jacket 4 (two jacket bodies 4.1, each jacket body 4.1 having an anchor portion 4.1.1 surrounding the main rod 1.3 and a jacket portion 4.1.2 surrounding the extension portion 1.4.3 so as to support the extension portion, each jacket portion 4.1.2 having a jacket connector end 4.1.2*a* and a pin end 4.1.2*b*) and the transducer described above. The light-emitting device 3 sleeves the horn 1.1, and the top jacket 4 sleeves an end of the transducer 1 close to the main rod 1.3. The piezoelectric ceramic 1.5 and the main rod 1.3 are arranged in the casing 2. A tail end of the connecting rod 1.4 extends through the top jacket 4 and extends to the tail end of the casing 2, so that a defect that a metal tube of the existing transducer and a connecting tube in a fixing seat are separated is overcome. In order to further improve the comfort of the handle, the transducer 1 further includes an injection molding structure 1.2 wrapping the piezoelectric ceramic 1.5. The upper and lower ends of the injection molding structure 1.2 are connected to the casing 2 through an upper O-ring 7.1 and a lower O-ring 7.2, respectively. It can be found from the current sample tests that this package structure not only improves the comfort of the handle, but also increases the power of the handle which is at least 40% higher than the power of a conventional package structure; and the package structure is very simple and can greatly improve the production efficiency.

The present invention further discloses a processing method of the dental scaler handle described above. The dental scaler handle described above further includes a socket A (the socket A being arranged in the fixing seat). A welding position of the socket A is packaged by using silica gel before the transducer 1 is assembled in the casing 2.

The silica gel has the characteristics of waterproofness, high temperature resistance and softness. The advantage of using the package according to the present invention is that under a waterproof and insulating condition, the extended length of the main rod and the softness of the silica gel can reduce the vibration influence of a water passage structure guided from the socket A on the main rod 1.3, thereby further improving the comfort of the handle.

It should be noted that the above package by using silica gel is carried out before the transducer 1 is assembled in the casing 2, so that on the one hand, the injection amount of silica gel may be controlled effectively; and on the other hand, it can avoid the technical problem that the handle such as the China HW-6 handle or the latest Satelec handle needs to overcome or avoid the defect about internal pressure of the handle. If the handle is packaged and then filled with silica gel, the internal pressure will cause the silica gel to be injected. On the contrary, if the handle is filled with silica gel and then packaged, the internal pressure does not exist; and meanwhile, the silica gel has high viscosity and poor flowability, so that the liquid level of the silica gel may be higher than the liquid level which is completely sealed, and the four lamp pins on the fixing seat may be higher than a welding side end surface of the lamp pins on the fixing seat, thereby greatly facilitating the soldering and resistance welding. Thus, the package is relatively simple and easy.

Further, the brazing sheet of the transducer 1 is bridge-connected, so that automatic welding is more convenient, a welding space is reduced, the reduction of the size of the handle is facilitated, and meanwhile, the ignition failure due to the leakage of the transducer 1 at this position is reduced.

Although the embodiments of the present invention have been illustrated and described above, it should be understood that the above-described embodiments are exemplary and are not to be construed as limiting the present invention. Those ordinary skilled in the art can make various changes, modifications, substitutions and variations to the above-described embodiments within the scope of the present invention.

We claim:

1. An ultrasonic dental scaler transducer system, comprising:
    a connecting rod having a front connecting rod end and a rear connecting rod end opposite said front connecting rod end;
    a horn at said front connecting rod end, said horn being comprised of a connecting groove, said front connecting rod end being in sealing engagement with said connecting groove;
    a main rod around said connecting rod, said connecting rod extending through said main rod;
    a piezoelectric ceramic being sleeved around said connecting rod, said piezoelectric ceramic being between said horn and said main rod;
    a handle being comprised of a casing with a proximal end and a distal end opposite said proximal end,
    wherein said connecting rod is comprised of an extension portion, said extension portion extending from said main rod toward said distal end of said casing, said main rod being positioned at said proximal end of said casing; and
    a top jacket being comprised of two jacket bodies, each jacket body being comprised of an anchor portion attached to said main rod and a jacket portion,
    wherein each jacket portion has a pin end and a jacket connector end, said pin end being at said distal end of said casing,
    wherein respective anchor portions of said two jacket bodies surround said main rod,
    wherein said respective jacket portions of said two jacket bodies surround said extension portion of said connection rod so as to support said extension portion, and
    wherein said rear connecting rod end extends from said main rod to said casing so as to maintain said connecting rod, said horn, said main rod and said piezoelectric ceramic coaxial within said handle.

2. The ultrasonic dental scaler transducer system, according to claim 1, wherein said rear connecting rod end extends 30-33 mm past said main rod toward said casing.

3. The ultrasonic dental scaler transducer system, according to claim 1, wherein said connecting rod has a diameter of 2 mm to 4 mm.

4. The ultrasonic dental scaler transducer system, according to claim 1, further comprising:
    a crescent ring being arranged between said main rod and said piezoelectric ceramic, said crescent ring being comprised of a circumference with two crescent-shaped protrusions are symmetrically arranged around said circumference.

5. The ultrasonic dental scaler transducer system, according to claim 4, wherein said crescent ring is comprised of stainless steel.

6. The ultrasonic dental scaler transducer system, according to claim 4, wherein said crescent ring has a diameter of 9 mm to 11 mm and a thickness of 0.5 mm to 1.5 mm.

7. The ultrasonic dental scaler transducer system, according to claim 1, wherein said connecting groove is comprised of an inner side wall facing said connecting rod, the system further comprising:
    a sleeve having a front sleeve end and a back sleeve end opposite said front sleeve end and being arranged in said connecting groove, said front sleeve end being in abutting connection with said inner side wall, said back sleeve end being in abutting connection with said front connecting rod end.

8. The ultrasonic dental scaler transducer system, according to claim 1, further comprising:
    a rigid polytetrafluoroethylene tube being arranged between said piezoelectric ceramic and said connecting rod.

9. The ultrasonic dental scaler transducer system, according to claim 8, wherein said rigid polytetrafluoroethylene tube extends into said connecting groove.

10. The ultrasonic dental scaler transducer system, according to claim 1, wherein said handle is further comprised of:
    a light-emitting device mounted on said horn, wherein said top jacket is between said casing and said piezoelectric ceramic.

* * * * *